US010189951B2

(12) United States Patent
Duan et al.

(10) Patent No.: US 10,189,951 B2
(45) Date of Patent: Jan. 29, 2019

(54) ALIPHATIC POLYIMIDES FROM A 1:2 MOLAR RATION OF DIAMINE AND UNSATURATED MONOANHYDRIDE OR UNSATURATED DIACID

(71) Applicant: PolyOne Corporation, Avon Lake, OH (US)

(72) Inventors: Yannan Duan, Westlake, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 49 days.

(21) Appl. No.: 15/305,866

(22) PCT Filed: Apr. 23, 2015

(86) PCT No.: PCT/US2015/027289
§ 371 (c)(1),
(2) Date: Oct. 21, 2016

(87) PCT Pub. No.: WO2015/164601
PCT Pub. Date: Oct. 29, 2015

(65) Prior Publication Data
US 2017/0051111 A1  Feb. 23, 2017

Related U.S. Application Data

(60) Provisional application No. 61/984,626, filed on Apr. 25, 2014.

(51) Int. Cl.
*C08G 73/12* (2006.01)
*C08G 73/10* (2006.01)
*C08L 79/08* (2006.01)

(52) U.S. Cl.
CPC ......... *C08G 73/121* (2013.01); *C08G 73/105* (2013.01); *C08G 73/106* (2013.01); *C08G 73/124* (2013.01); *C08G 73/125* (2013.01); *C08L 79/08* (2013.01)

(58) Field of Classification Search
CPC . C08G 73/121; C08G 73/106; C08G 73/1085
See application file for complete search history.

(56) References Cited

U.S. PATENT DOCUMENTS

| | | | | |
|---|---|---|---|---|
| 3,380,964 | A | * | 4/1968 | Sambeth ............... C03C 3/074 428/473.5 |
| 3,533,996 | A | * | 10/1970 | Sambeth ............... C03C 3/074 526/210 |
| 3,732,188 | A | * | 5/1973 | Holub et al. ......... C08G 73/121 528/183 |
| 4,179,551 | A | | 12/1979 | Jones et al. |
| 6,495,657 | B1 | | 12/2002 | McDonald et al. |
| 7,208,566 | B2 | | 4/2007 | Mizori et al. |
| 8,415,812 | B2 | | 4/2013 | Dershem et al. |
| 2008/0262191 | A1 | | 10/2008 | Mizori |
| 2012/0283378 | A1 | * | 11/2012 | Shoshi ................... C07F 7/0847 524/556 |
| 2017/0044319 | A1 | | 2/2017 | Duan et al. |
| 2017/0044320 | A1 | | 2/2017 | Duan et al. |
| 2017/0051111 | A1 | | 2/2017 | Duan et al. |

FOREIGN PATENT DOCUMENTS

CN           103074030 A  *  5/2013

OTHER PUBLICATIONS

Chen-Shan (Thermally initiated cure kinetic of bismaleimides containing poly(dimethylsiloxane). Polymer, 40, 1999, pp. 5407-5413).*
Machine translated English language equivalent of CN 103074030 (2013, 8 pages).*
Vazquez (UV-Curable Bismaleimides Containing Poly(dimethylsiloxane): Use as Hydrophobic Agent, Journal of Polymer Science: Part A: Polymer Chemistry, 48, 2010, 2123-2134).*
Gelest (Aminopropyl Terminated Polydimethylsiloxane, 10-15 cSt, 2018, 2 pages).*
Feng, J. et al., "Synthesis and Characterization of the Bismaleimides Containing Aliphatic-ether Chain for Microelectronics Application," e-Polymers 2006, No. 044, pp. 1-11.
Hartford, S. et al., "Synthesis of N-Substituted Bisitaconimide Monomers for Use as Thermosetting Polyimide Resins," Journal of Polymer Science: Polymer Chemistry Edition, vol. 16, No. 1, Jan. 1978, pp. 137-153.
Kovacic, P. et al., "Cross-linking of Polymers with Dimaleimides," Journal of the American Chemical Society, 1959, vol. 81, No. 5, pp. 1187-1190.
Li, B. et al., "High modulus aliphatic polyimide from 1, 3-diaminopropane and ethylenediaminetetraacetic dianhydride: Water soluble to self-patterning," Polymer, 2011, vol. 52, No. 22, pp. 5186-5192.
Mather, B. et al., "Michael addition reactions in macromolecular design for emerging technologies," Progress in Polymer Science, 2006, vol. 31, pp. 487-531.
Mathews, A. et al., "Fully Aliphatic Polyimides from Adamantane-Based Diamines for Enhanced Thermal Stability, Solubility, Transparency, and Low Dielectric Constant," Journal of Applied Polymer Science, vol. 102, 3316-3326 (2006).
Mathews, A. et al., "Synthesis and Characterization of Novel Fully Aliphatic Polyimidosiloxanes Based on Alicyclic or Adamantyl Diamines," Journal of Polymer Science: Part A: Polymer Chemistry, vol. 44, 5254-5270 (2006).
Popov-Pergal, K. et al., "Thermal, oxidative and radiation stability of polyimides I. Bismaleimidoethane and different diamine-based polyimides," Polymer Degradation and Stability, 2000, vol. 67, Issue 3, pp. 547-552.
Vygodskii, Y. et al., "Synthesis and Investigation of Crosslinked Polymers Based on Aliphatic Bismaleimides and Cardic Diamines," Polymer Science U.S.S.R., vol. 21, pp. 2951-2959, Pergamon Press Ltd. 1980.

(Continued)

*Primary Examiner* — Catherine S Branch
(74) *Attorney, Agent, or Firm* — John H. Hornickel

(57) ABSTRACT

Aliphatic polyimides are synthesized by a 2:1 molar ratio reaction of an unsaturated monoanhydride or an unsaturated diacid with a diamine. Bio-derived monomers are particularly useful in the synthesis of the aliphatic polyimides.

5 Claims, No Drawings

(56) References Cited

OTHER PUBLICATIONS

White, J. et al., "Reactions of Diaminoalkanes with Bismaleimides: Synthesis of Some Unusual Polyimides," Journal of Applied Polymer Science, 1984, vol. 29, pp. 891-899.
International Preliminary Report on Patentability (Chapter I) for PCT/US2015/027285 (U.S. Pat. Appln. Pub. No. 20170044320).
International Preliminary Report on Patentability (Chapter I) for PCT/US2015/027289 (U.S. Pat. Appln. Pub. No. 20170051111).
International Preliminary Report on Patentability (Chapter I) for PCT/US2015/027293 (U.S. Pat. Appln. Pub. No. 20170044319).
Galanti, A. et al.: "The Synthesis of Biscitraconimides and Polybiscitraconimides," Journal of Polymer Science, Polymer Chemistry Edition, vol. 19, No. 2, Feb. 1981, pp. 451-475, XP055410601.

* cited by examiner

ALIPHATIC POLYIMIDES FROM A 1:2 MOLAR RATION OF DIAMINE AND UNSATURATED MONOANHYDRIDE OR UNSATURATED DIACID

CLAIM OF PRIORITY

This application claims priority from U.S. Provisional Patent Application Ser. No. 61/984,626 filed on Apr. 25, 2014, which is incorporated by reference.

FIELD OF THE INVENTION

This application concerns the synthesis of aliphatic polyimides, preferably from bio-based ingredients using a 2:1 molar ratio of unsaturated monoanhydride or unsaturated diacid:diamine.

BACKGROUND OF THE INVENTION

In recent years there has been an increasing interest in polymers derived from non-petroleum sources. These bio-derived polymers are more sustainable since they are derived from renewable sources and can be made from domestically produced monomers. Unfortunately most bio-derived polymers have been technical constrained in durable applications by having low glass transition temperatures (Tgs) (and hence, low heat distortion temperatures for amorphous polymers), low impact strength, and limited hydrolytic stability.

A key example of a commercially available bio-derived polymer is poly lactic acid, or PLA, that is derived from the fermentation of sugar from corn, but soon to be from tapioca, sugar cane, and eventually cellulose. Sugar is fermented to lactic acid which is converted into lactide (dimer of lactic acid) chemically and further chemically polymerized to polymer. PLA is clear and 100% bio-derived but unfortunately has a low Tg of about 56° C. and is brittle. Attempts have been made to develop higher glass transition polymers via copolymerization with monomers such as furan/isosorbide that yield furan/isosorbide that yield higher Tg polymers. Unfortunately these monomers are currently either in short supply or very expensive.

SUMMARY OF THE INVENTION

What is desired is a general class of polymer that fits the at least most of the following criteria:

Tg>65° C., hydrolytic stability close to PET, improved flammability over PLA, e.g. Limiting Oxygen Index>17%, largely bio-derived content >90%, preferably 100%, properties that can be easily tailored by monomer selection, applicable to a reactive extrusion process, cost effective, e.g. in both conversion process and raw materials costs.

It was decided to investigate the class of aliphatic polyimides, due to the availability of suitable monomers and properties of polyimides relative to the criteria above.

One aspect of the present invention is an aliphatic polyimide selected from the group consisting of:

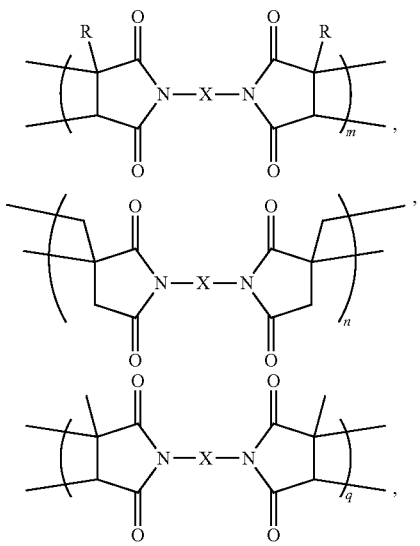

and combinations thereof, wherein m is greater than 20, n is greater than about 20, and wherein q is greater than about 20, wherein R is H for maleic anhydride or is $CH_3$ for citraconic anhydride, and $X=(CH_2)_z$,

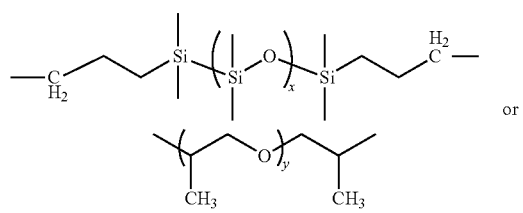

wherein x is 1 to 100, wherein y is 1 to 100, and wherein z is 2 to 12.

EMBODIMENTS OF THE INVENTION

Polyimides

Polyimides are an important class of polymers which have been utilized commercially in the areas of aerospace, electronics, photovoltaics, and membranes. Polyimides as a class of polymers possess several desirable properties, especially high thermal stability, very good electrical properties, low moisture uptake, low flammability characteristics, good hydrolytic stability, and flexibility in modifying properties via monomer selection and amount.

Polyimides are typically prepared commercially from a dianhydride and a diamine in a solution process, but melt processes have been described and are desired. Another route from isocyanurates and dianhydrides to polyimides has also described.

Additionally the ability of the properties of polyimides to be modified dramatically by the proper selection of monomers provides this class of polymers a unique degree of molecular design not seen with most polymers.

Polyimides can be classified into thermosetting or thermoplastic. Typically, the thermosetting type of polyimide is prepared by choosing the appropriate end-capping moiety with sequential crosslinking or curing at that point. However, polyimides with elastomeric blocks and liquid crystal blocks have also been prepared.

Polyimides can be further classified as to whether the starting monomers are all aromatic or aliphatic (cyclic, straight chain, or both) or a combination of both.

Typically for high temperature applications, the wholly aromatic polyimides are chosen, and hybrids can be used for specific applications, e.g., where the aliphatic is a diamino siloxane, an elastomeric polymer can be obtained. However aliphatic polyimides are being reinvestigated for lower temperature optical applications where the non-aromatic characteristics give the polyimide polymer less inherent color and yet retain good dielectric properties.

An area that had not been explored until this invention was an attempt to make high molecular weight polyimides from unsaturated monoanhydrides and preferably from "bio-derived monomers". For purposes of this invention, "bio-derived monomers" means monomers which are, or foreseeably can be made from, biologically active sources, such as bio-mass. Even though some of the experiments might rely upon petrochemical sources, as stated in the text following the experiments, the literature describes means of making the various monomers or their precursors from biologically active sources. Therefore, this invention is not to be limited to only those monomers presently bio-derived but also includes those monomers presently petrochemically derived but become also available from biologically active sources While this work emphasizes thermoplastic materials, a person having ordinary skills in the art would know how to modify the polyimide endgroups to render the polymer capable of thermosetting. That person would also understand how to incorporate elastomeric segments to yield an elastomeric polyimide.

In this invention, totally aliphatic class of polyimides were explored, because at present there is no readily available source of naturally occurring aromatic amines and/or anhydrides derived from bio-mass. However, several aliphatic anhydrides are available from citric acid, namely itaconic and citraconic anhydrides, obtained by the heating of citric acid which itself can be obtained from citrus waste streams or by fermentation of glucose. As well the corresponding di-acids are available. Additionally butanediol is becoming available from bio-mass, and there are chemical methods to manufacture maleic anhydride from butanediol as well as from succinic acid, which is currently being produced from bio-mass.

Unfortunately there are no dianhydrides readily available from bio-mass. So a method had to be sought that could transform aliphatic mono-anhydrides into aliphatic dianhydrides. Initially it was thought from a study of U.S. Pat. No. 6,495,657 that this transformation was a straightforward task. Unfortunately, this was not the case, but new approaches were developed in order to have the desired difunctionality necessary to make high molecular weight polyimides.

On the amine side, aliphatic amines are usually found in the degradation of amino acids, but the most readily available diamines today are 1,10 diamino decane and 1,9 diamino nonane both derived from castor bean oil, a bio-based or otherwise renewable resource. There are already efforts to make 1,6 hexane diamine from bio-mass because of its use in making nylon 6,6. And recently a "green synthesis" for the production of amines from alcohols has also been published which may open the way to further diamines of shorter chain length, e.g. 1,4 diamino butane from 1,4 butanediol, 1,3 and 1,2 diaminopropanes from 1,3 propanediol and 1,2 propanediol respectively, and finally ethylene diamine from ethylene glycol. Recently, 1,5 pentamethylenediamine made from bio-mass or sugar through micro-organism process is commerically available, and it has been used to make bio-based nylons.

Before this work, the only aliphatic polyimides from biologicalsources that was found in the literature was described in U.S. Pat. No. 4,046,748, where an attempt was made of synthesizing a bio-polyimide polymer from a terpene. It describes the preparation of a dianhydride by reacting a terpene and maleic anhydride; unfortunately the major adduct about 85% is a monoanhydride with only about 15% of the product being a dianhydride, which is necessary for making high molecular weight polyimide. Reaction with a difunctional amine yielded a polymer with a number average molecular weight 704 g/mole. This material was not truly polymeric in nature and was only useful as a tackifying resin. No attempts were described to isolate or separate the dianhydride from the reaction mixture for further attempts at polymerization.

Therefore, aliphatic polyimides preferably from bio-derived monomers, as defined above, were explored and found to be capable of polymerization, according to this invention.

Experiments and Results

Experimental Methods

All materials were purchased from Sigma-Aldrich or other suppliers and used as received.

In order to quickly determine whether double bonds were present, the Baeyer test with aqueous permanganate ion was utilized. The purple aqueous permanganate ion color changes to a brownish precipitate if oxidization of C=C double bonds occurs. Appropriate FT-IR was used to determine the presence of functional groups, e.g presence of imide group. Because the polymeric materials obtained were largely insoluble, CHN elemental analysis was used to determine structures by best fit to theoretical structures. Thermal analyses were utilized to determine Tg, and weight loss. Determination of thermoplastic nature was determined by the characterizing the reversible deformability of polymeric films on a hot heating plate. Color was noted visually.

Instrumental Information:

Fourier transform infrared spectroscopy (FTIR) was used to identify the presence of functional groups. The spectra for polyimide films were collected by transmission mold using Nicolet 710, pressed in the diamond anvil optical cell. The spectra for intermediates were collected by transmission mode with the same instrument using liquid film technique on Germanium.

Differential scanning calorimetry (DSC) was utilized to determine glass transition temperature and thermal stability. The samples were analyzed using a TA Instruments model DSC Q2000. The specimens were exposed to a heat-cool-heat cycle in the analysis. The temperature range of each segment was from −60° C. to 120° C. (or 180° C. or 240° C.) at heating/cooling rates of 10° C./minute. A helium gas purge of 25 ml/minute was used. The glass transition temperature (Tg) of the sample was determined using the half-height from the data recorded in the second heating segment of the analysis.

Thermogravimetric analysis (TGA) was utilized to determine the thermal stability of bio-derived polyimide films. The samples were analyzed using a TA Instruments model TGA Q2000. The temperature range was from room temperature to 700° C. at a heating rate of 10° C./minute in air with a flow rate of 70 mL/min.

Gel permeation chromatography (GPC) was utilized to obtain information on number-average molecular weight, weight-average molecular weight and molecular weight distribution using Waters Corporation modular HPLC/GPC system including Model 2414 Refractive Index Detector (RI), Model 515 HPLC Pump and Model 717plus Autosampler. The samples were processed on Justice Systems Chrom Perfect software. The solvent used was tetrahydrofuran (THF). Standard polystyrenes were used for calibration.

Gas chromatography/mass spectrometry (GC-MS) was utilized to analyze the structure of intermediate using HP 6890 series GC system and HP 5943 mass-selective detector. The temperature used for this test was 250° C.

CHN elemental analysis was done at Robertson Microlit Laboratories Inc. in NJ. Silicon content was done in the same lab using microwave digestion method.

The weathering properties of aliphatic polyimides were studied by dry QUV accelerated weathering test following ASTM D4329. Samples are mounted in the QUV apparatus and subjected to a continuous exposure at 40° C. to intense ultraviolet radiation without moisture exposure or condensation. The testing was done using Q-Panel QUV/se with Solar Eye irradiance controller with UVA-351 lamp. The total testing time is 1000 hours. Samples were taken out for color reading and FT-IR analysis at the beginning of test and every 250 hours.

Use of 2:1 Anhydride:Diamine

Several types of reaction could happen with the presence of anhydride, C=C bonds, and amine group. One is the aza-Michael Addition of amine group to C=C double bonds. If this reaction occurs, a dianhydride can be derived from an unsaturated monoanhydride. One reaction is the typical reaction for polyimide between anhydride and amine groups to form imide functionality. Another one is the reaction between C=C double bonds at high temperature. These reactions could occur preferably at a certain condition when different stoichiometry is used. In the case of this method, both moles of amine groups were expected to form bis(maleimide) with 2 moles of anhydrides. And the C=C double bonds could react then and form a polymer.

Table A shows the ingredients used in all Examples of this document, except the sodium phenyl phosphinate which was synthesized as follows:

14.21 grams of phenylphosphinic acid (0.10 mole) was dissolved in 50 mL of methanol at room temperature in a 250 mL single-neck round bottom flask along with a magnetic stirring bar. Then 4.00 grams of sodium hydroxide (0.10 mole) was added and dissolved. The reaction was observed to be exothermic. The solution was kept stirring at room temperature for one hour. The pH value of the final solution was tested by a piece of pH test paper. The pH value was 7.

Most of the solvent was evaporated by keeping the flask in the hood for three days. Then a white solid precipitated out from the solution. The resulting solution was filtered. The white solid was vacuum dried at 60° C. overnight to remove any residual solvent or moisture. The final material was a white solid of 11.87 grams.

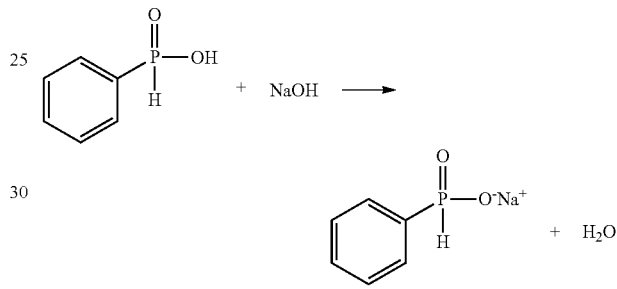

TABLE A

| Chemical Name | Form | CAS Number | Vendor | Structure |
|---|---|---|---|---|
| citraconic anhydride | liquid | 616-02-4 | Sigma Aldrich | |
| maleic anhydride | white solid | 108-31-6 | Sigma Aldrich | |
| itaconic anhydride | white solid | 2170-03-8 | Sigma Aldrich | |
| citraconic acid | white solid | 498-23-7 | Sigma Aldrich | |
| itaconic acid | white solid | 97-65-4 | Sigma Aldrich | |
| 1,10 diaminodecane | white solid | 646-25-3 | Sigma Aldrich | $NH_2CH_2(CH_2)_8CH_2NH_2$ |

TABLE A-continued

| Chemical Name | Form | CAS Number | Vendor | Structure |
|---|---|---|---|---|
| hexamethylenediamine | waxy solid | 124-09-4 | Sigma Aldrich | $H_2NCH_2(CH_2)_4CH_2NH_2$ |
| 1,4 diaminobutane | waxy solid | 110-60-1 | Sigma Aldrich | $H_2N\text{-}(CH_2)_4\text{-}NH_2$ |
| ethylene diamine | liquid | 107-15-3 | Sigma Aldrich | $H_2N\text{-}CH_2CH_2\text{-}NH_2$ |
| 1,12 diaminododecane | white solid | 2783-17-7 | Sigma Aldrich | $H_2NCH_2(CH_2)_{10}CH_2NH_2$ |
| Jeffamine ® D-230 | viscous liquid | 9046-10-0 | Huntsman | $H_2N\text{-}CH(CH_3)CH_2\text{-}[OCH_2CH(CH_3)]_x\text{-}NH_2$, x = 25 |
| polydimethylsiloxane, DMS-A11 | viscous liquid | 106214-84-0 | Gelest, Inc. | aminopropyl-terminated polydimethylsiloxane |
| Irganox ® MD 1024 Chemical name: 2',3-bis[[3-[3,5-di-tert-butyl-4-hydroxyphenyl] propionyl]] propionohydrazide | white solid | 32687-78-8 | Ciba Inc., now part of BASF | [HO-(3,5-di-tert-butyl-phenyl)-(CH$_2$)$_2$-C(O)-NH-]$_2$ |
| Irgafos ® P-EPQ chemical name: [4-[4-bis(2,4-ditert-butylphenoxy) phosphanylphenyl] phenyl]-bis(2,4-ditert-butylphenoxy)phosphane | white solid | 119345-01-6 | Ciba Inc., now part of BASF | biphenyl bis[bis(2,4-di-tert-butylphenoxy)phosphane] |
| Irganox ® 1010 Chemical name: pentaerythritol tetrakis(3-(3,5-di-tert-butyl-4-hydroxyphenyl) propionate) | white solid | 6683-19-8 | Ciba inc., now part of BASF | [HO-(3,5-di-tert-butyl-phenyl)-(CH$_2$)$_2$-C(O)-O-CH$_2$-]$_4$C |
| methanol | liquid | 67-56-1 | Sigma Aldrich | $CH_3OH$ |

TABLE A-continued

| Chemical Name | Form | CAS Number | Vendor | Structure |
|---|---|---|---|---|
| isopropanol | liquid | 67-63-0 | Sigma Aldrich | 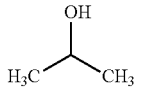 |
| tetrahydrofuran | liquid | 77392-70-2 | Sigma Aldrich |  |
| sodium phenyl phosphinate | white solid | 4297-95-4 | Synthesized as reported above. | 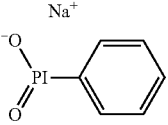 |

Examples 1-11—Anhydride

A diamine is added to a monoanhydride with a 2:1 molar ratio, giving a ring-opened amic acid. Then the intermediate self-polymerizes at high temperature, forming a polymeric imide structure.

Below is the reaction scheme of this for anhydride Examples 1-11.

Reaction Scheme for Examples 1-11

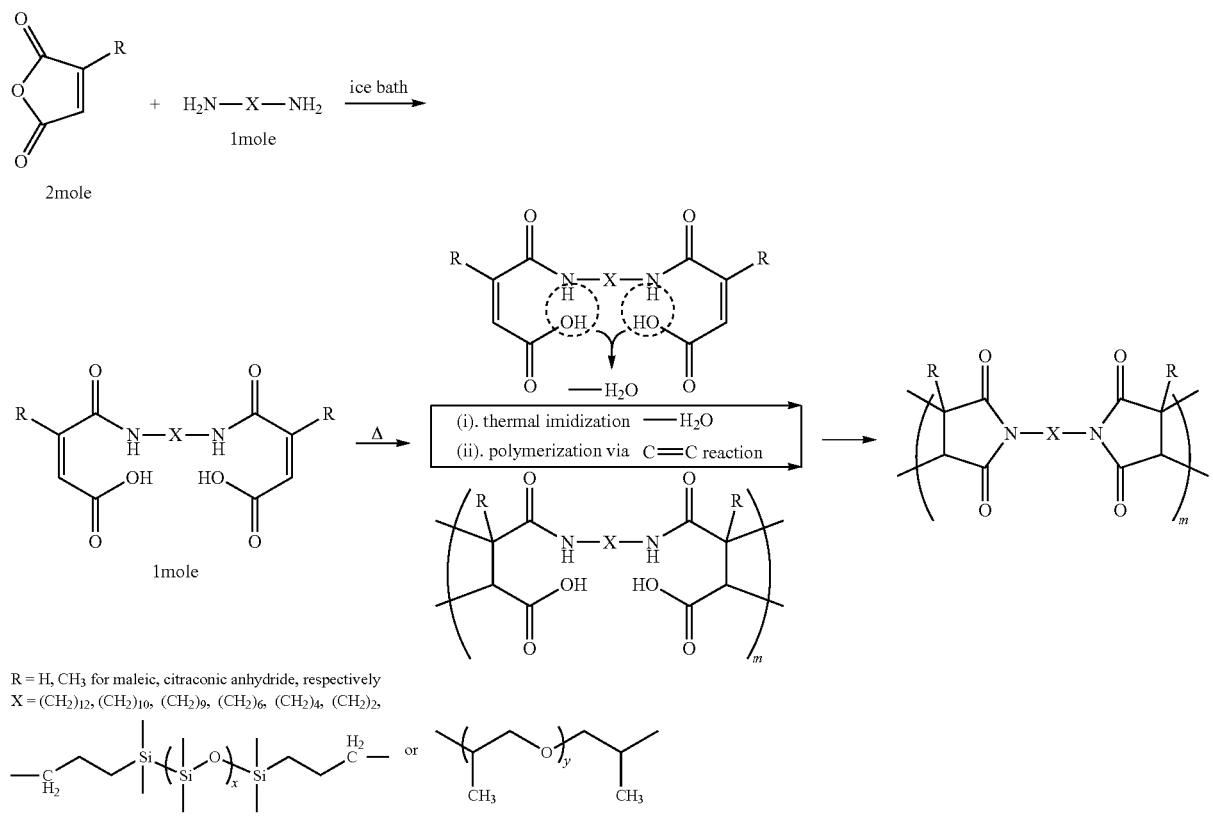

wherein m is greater than 20 and desirably greater than 150, wherein x can be 1 to 1000, desirably about 5 to about 25, and preferably about 8 to about 14 and wherein y can be 1 to 100, desirably about 2 to about 35, and preferably about 2 to about 8.

Example 1: poly-3,3'4,4'-yl-((1,1'-decane-1,10-diyl)-bis-(1-pyrrolidine-2,5-dione)) (AP-A, R=H, X=$C_{10}H_{20}$)

A thermoplastic polymer intermediate was prepared as follows. First, 1.9612 g of commercially available maleic anhydride (0.02 mole) was dissolved in 10 g methanol in a single-neck flask along with a magnetic stirring bar. The flask was cooled down at room temperature with magnetic agitation. Then, 1.7231 grams of commercially available 1,10-diaminodecane (0.01 mole) was dissolved in 15 grams of methanol and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, methanol was removed by evaporation at room temperature. Then, the viscous light yellow liquid was kept at 60° C. for 2 hours, and temperature was ramped to 220° C. at a rate of 3° C./min. Finally, an amber-colored flexible film was formed and this film was sent for Tlierniogravirnetric Analysis (TGA) and Differential Scanning calorimetry (DSC). This final amber-colored film was brittle, and not as robust as films obtained in the previous examples, and it can be dissolved in sulfuric acid. These observations tend to suggest a lower molecular weight material than seen via other polyimides. The FT-IR spectrum was similar to the previous spectra collected. However, the amount of imide in this example appeared to be lower than that seen in the other samples. The broadness of the spectral bands and insoluble nature of the film suggested that the film was polymeric and not the predicted di-maleimide. The film was sent for CHN elemental analysis to determine structure. Its thermoplastics behavior was demonstrated while being heated on a hot plate around 220° C. It can be softened, be bent and twisted during heating. The deformation is maintained if the film is cooled to room temperature, and its original shape can be recovered during a second heating. DSC result showed a Tg transition of 89° C.

Example 2: poly-3,3'4,4'-yl-((1,1'-decane-1,10-diyl)-bis-(3-methyl-1-pyrrolidine-2,5-dione)) (AP-A, R=$CH_3$, X=$C_{10}H_{20}$) in methanol A thermoplastic polymer intermediate was prepared as follows. First, 2.2416 g of commercially available citraconic anhydride (0.02 mole) was dissolved in 10 g methanol in a single-neck flask along with a magnetic stirring bar. The flask was cooled down at room temperature with magnetic agitation. Then, 1.7231 grams of commercially available 1,10-diaminodecane (0.01 mole) was dissolved in 15 grams of methanol and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, methanol was removed by evaporation at room temperature. Then, the viscous light yellow liquid was kept at 60° C. for 2 hours, and temperature was ramped to 220° C. at a rate of 3° C./min. Finally, an amber-colored film was formed and this film was sent for Differential Scanning calorimetry (DSC) to determine Tg. DSC result showed a Tg of 54° C. The film was sent for CHN elemental analysis to determine structure. Its thermoplastics behavior was demonstrated while being heated on a hot plate around 220° C. It can be softened, be bent and twisted during heating. The deformation is maintained if the film is cooled to room temperature, and its original shape can be recovered during a second heating.

Example 3: poly-3,3'4,4'-yl-((1,1'-decane-1,10-diyl)-bis-(3-methyl-1-pyrrolidine-2,5-dione)) (AP-A, R=$CH_3$, X=$C_{10}H_{20}$) in iPA A thermoplastic polymer intermediate was prepared as follows. First, 2.2416 g of commercially available citraconic anhydride (0.02 mole) was dissolved in 10 g isopropanol in a single-neck flask along with a magnetic stirring bar. The flask was cooled down at room temperature with magnetic agitation. Then, 1.7231 grams of commercially available 1,10-diaminodecane (0.01 mole) was dissolved in 30 grams of isopropanol and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, isopropanol was removed by evaporation at room temperature. Then, the viscous light yellow liquid was kept at 60° C. for 2 hours, and temperature was ramped to 220° C. at a rate of 3° C./min. Finally, an amber-colored, flexible film was formed and this film was sent for Differential Scanning calorimetry (DSC) to determine Tg. DSC result showed a Tg of 14° C. The film was sent for CHN elemental analysis to determine structure. Its thermoplastics behavior was demonstrated while being heated on a hot plate around 220° C. It can be softened, be bent and twisted during heating. The deformation is maintained if the film is cooled to room temperature, and its original shape can be recovered during a second heating.

Example 4: poly-3,3'4,4'-yl-((1,1'-decane-1,10-diyl)-bis-(3-methyl-1-pyrrolidine-2,5-dione)) (AP-A, R=$CH_3$, X=$C_{10}H_{20}$) in THF A thermoplastic polymer intermediate was prepared as follows. First, 2.2416 g of commercially available citraconic anhydride (0.02 mole) was dissolved in 10 g tetrahydrofuran in a single-neck flask along with a magnetic stirring bar. The flask was cooled down at room temperature with magnetic agitation. Then, 1.7231 grams of commercially available 1,10-diaminodecane (0.01 mole) was dissolved in 30 grams of tetrahydrofuran and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, tetrahydrofuran was removed by evaporation at room temperature. Then, the viscous light yellow liquid was kept at 60° C. for 2 hours, and temperature was ramped to 220° C. at a rate of 3° C./min. Finally, an amber-colored, flexible film was formed and this film was sent for Differential Scanning calorimetry (DSC) to determine Tg. DSC result showed a Tg of 44° C. The film was sent for CHN elemental analysis to determine structure. Its thermoplastic behavior was demonstrated while being heated on a hot plate around 220° C. It can be softened, be bent and twisted during heating. The deformation is maintained if the film is cooled to room temperature, and its original shape can be recovered during a second heating.

Example 5: poly-3,3'4,4'-yl-((1,1'-hexane-1,6-diyl)-bis-(3-methyl-1-pyrrolidine-2,5-dione)) (AP-A, R=$CH_3$, X=$C_6H_{12}$)

A thermoplastic polymer intermediate was prepared as follows. First, 2.2416 g of commercially available citraconic anhydride (0.02 mole) was dissolved in 10 g isopropanol in a single-neck flask along with a magnetic stirring bar. The flask was cooled down at room temperature with magnetic agitation. Then, 1.1621 grams of commercially available hexylmethylenediamine (0.01 mole) was dissolved in 30 grams of isopropanol and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, isopropanol was removed by evaporation at room temperature. Then, the viscous light yellow liquid was kept at 60° C. for 2 hours, and temperature was ramped to 220° C. at a rate of 3° C./min. Finally, an amber-colored, flexible film was formed and this film was sent for Differential Scanning calorimetry (DSC) to determine Tg. DSC result showed a Tg of 30° C. The film was sent for CHN elemental analysis to determine structure. Its thermoplastics behavior was demonstrated while being heated on a hot plate around 220° C. It can be softened, be bent and twisted during heating. The deformation is maintained if the film is cooled to room temperature, and its original shape can be recovered during a second heating.

Example 6: poly-3,3'4,4'-yl-((1,1'-butane-1,4-diyl)-bis-(3-methyl-1-pyrrolidine-2,5-dione)) (AP-A, R=$CH_3$, X=$C_4H_8$)

A thermoplastic polymer intermediate was prepared as follows. First, 2.2416 g of commercially available citraconic anhydride (0.02 mole) was dissolved in 10 g isopropanol in a single-neck flask along with a magnetic stirring bar. The flask was cooled down at room temperature with magnetic agitation. Then 0.8815 grams of commercially available 1,4 diaminobutane (0.01 mole) was dissolved in 30 grams of isopropanol and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, isopropanol was removed by evaporation at room temperature. Then, the viscous light yellow liquid was kept at 60° C. for 2 hours, and temperature was ramped to 220° C. at a rate of 3° C./min. Finally, an amber-colored, flexible film was formed and this film was sent for Differential Scanning calorimetry (DSC) to determine Tg. DSC result showed a Tg of 60° C. The film was sent for CHN elemental analysis to determine structure. Its thermoplastics behavior was demonstrated while being heated on a hot plate around 220° C. It can be softened, be bent and twisted during heating. The deformation is maintained if the film is cooled to room temperature, and its original shape can be recovered during a second heating.

Example 7: poly-3,3'4,4'-yl-((1,1'-ethane-1,2-diyl)-bis-(3-methyl-1-pyrrolidine-2,5-dione)) (AP-A, R=$CH_3$, X=$C_2H_4$)

A thermoplastic polymer intermediate was prepared as follows. First, 2.2416 g of commercially available citraconic anhydride (0.02 mole) was dissolved in 10 g isopropanol in a single-neck flask along with a magnetic stirring bar. The flask was cooled down at room temperature with magnetic agitation. Then 0.6010 grams of commercially available ethylenediamine (0.01 mole) was dissolved in 15 grams of isopropanol and then added dropwise into the solution over one hour period with stirring. The solution was clear and the addition required about two hours. The intermediate reaction product was kept in solution and used as is for the next step. Baeyer test result was positive, which confirmed the existence of C=C double bonds at this stage.

The intermediate solution prepared above was used to prepare polyimide film via thermal imidization. First, isopropanol was removed by evaporation at room temperature. Then, the viscous light yellow liquid was kept at 60° C. for 2 hours, and temperature was ramped to 220° C. at a rate of 3° C./min. Finally, an amber-colored, rigid film was formed and this film was sent for Differential Scanning calorimetry (DSC) to determine Tg. DSC result showed a Tg of 170° C. The thermoplastic behavior of the films was demonstrated while being heated on a hot plate around 220° C. The film can soften, be bent and twisted during heating. The deformation is maintained if the film is cooled to room temperature, and its original shape can be recovered during a second heating. Once it's removed from heat, the film became rigid immediately, suggesting it has a higher Tg than previous samples. The film was sent for CHN elemental analysis to determine structure.

Example 8: poly-3,3'4,4'-yl-((1,1'-nonane-1,9-diyl)-bis-(3-methyl-1-pyrrolidine-2,5-dione)) (AP-A, R=$CH_3$, X=$C_9H_{18}$)

A thermoplastic polymer intermediate was prepared as follows. First, 1.1209 g of commercially available citraconic anhydride (0.01 mole) was dissolved in 10 g methanol in a single-neck flask along with a magnetic stirring bar. The flask was cooled down at room temperature with magnetic agitation. Then, 0.7914 grams of commercially available 1,9-diaminononane (0.005 mole) was dissolved in 15 grams of methanol and then added dropwise into the solution over one hour period with stirring. The solution was clear and the addition required about two hours. The reaction was noticed to be exothermic. The intermediate reaction product was kept in solution and used as is for the next step. The intermediate solution prepared above was used to prepare polyimide film via thermal imidization. First, methanol was removed by evaporation at room temperature. Then, the viscous light yellow liquid was kept at 60° C. under vacuum for 2 hours, and temperature was ramped to 220° C. at a rate of 3° C./min. Finally, an amber-colored flexible film was formed. This film was sent for Thermogravimetric Analysis (TGA) and Differential Scanning calorimetry (DSC). The film was sent for CHN elemental analysis to determine structure. DSC result showed a Tg transition of 54° C.

Example 9 poly-3,3',4,4'-yl-((1,1'-bis trimethylene-poly dimethyl siloxane-1,ω-diyl)-bis-(3-methyl-pyrrolidine-2,5-dione)) (ω means at the other terminal end)

An intermediate was prepared via reaction between a monoanhydride and a diamine with molar ratio of 2:1. First, 0.5604 g of commercially available citraconic anhydride (0.005 mole) was dissolved in 10 g methanol in a single-neck flask along with a magnetic stirring bar. Then, 2.2015 grams of commercially available aminopropyl terminated polydimethylsiloxanes (DMS A11 from Gelest, Inc., MW=850-900, around 0.0025 mole) was dissolved in 20 grams of methanol and then added dropwise into the solution over a one hour period. The flask was kept stirring continuously for another two hours. The solution was clear. The reaction was noticed as exothermic. The intermediate obtained in this step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored, very soft and sticky film, which indicated a lower Tg compared to other examples. The film was sent for CHN elemental analysis to determine structure. DSC result showed no Tg transition above −30° C.

Example 10: poly-3,3',4,4'-yl-(1,1'-poly-oxypropylene-1,ω-diyl)-bis-(3-methyl-1-pyrrolidine-2,5-dione)

An intermediate was prepared via reaction between a monoanhydride and a diamine with molar ratio of 2:1. First, 1.1208 g of commercially available citraconic anhydride (0.01 mole) was dissolved in 10 g methanol in a single-neck flask along with a magnetic stirring bar. Then, 1.1509 grams of commercially available Jeffamine D-230 Polyetheramine from Huntsman (MW=230, 0.005 mole) was dissolved in 20 grams of methanol and then added dropwise into the solution over a one hour period. The flask was kept stirring continuously for another two hours. The solution was in very light yellow color. The reaction was noticed as exothermic. The intermediate obtained in the first step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored soft film, which indicated a low Tg. The film was sent for CHN elemental analysis to determine structure. DSC result showed a Tg transition of 34° C.

Example 11: poly-3,3',4,4'-yl-((1,1'-dodecane-1,12-diyl)-bis-(3-methyl-1-pyrrolidine-2,5-dione))

An intermediate was prepared via reaction between a mono anhydride and a diamine with molar ratio of 2:1. First, 1.1208 g of commercially available citraconic anhydride (0.01 mole) was dissolved in 10 g methanol in a single-neck flask along with a magnetic stirring bar. Then, 1.0019 grams of commercially available 1,12-diaminododecane (0.005 mole) was dissolved in 20 grams of methanol and then added dropwise into the solution over a one hour period. The flask was kept stirring continuously for another two hours. The reaction was noticed as exothermic. White precipitates appeared. Baeyer test result was positive, which confirmed the existence of C=C double bonds at this stage. The intermediate obtained in the first step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored flexible film. The film was sent for CHN elemental analysis to determine structure. DSC result gave a Tg of 29° C.

Examples 12-13

A monoanhydride reacts with a diamine with a 2:1 molar ratio, giving a ring-opened amic acid. Then the intermediate self-polymerizes at high temperature, forming a polymeric imide structure.

Below is the reaction scheme of this for anhydride Examples 12-13.

Reaction Scheme for Examples 12 and 13

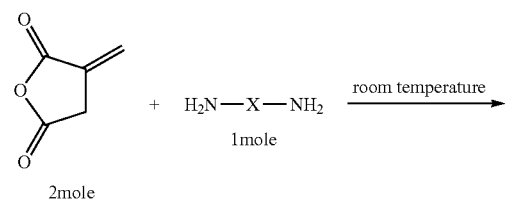

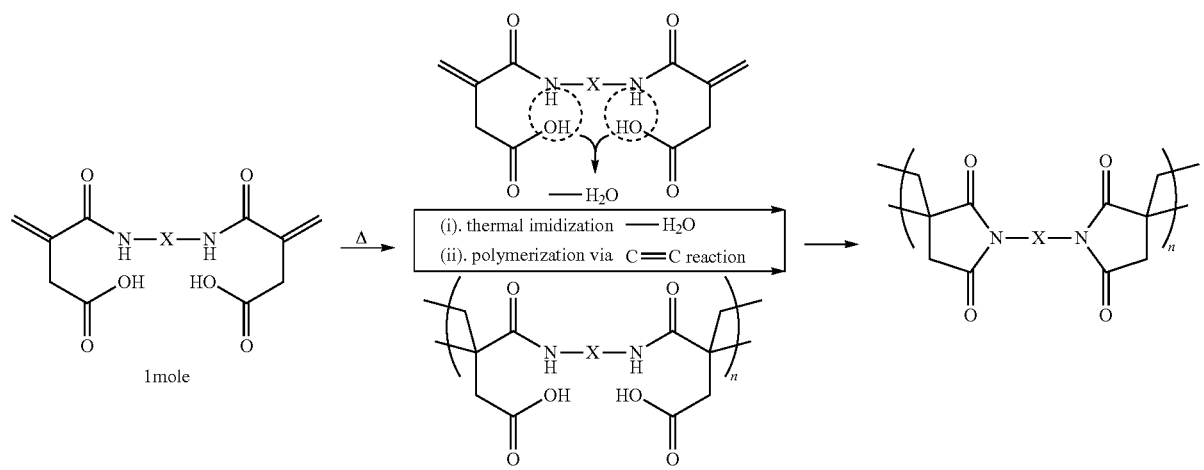

$X = (CH_2)_{12}, (CH_2)_{10}, (CH_2)_9, (CH_2)_6, (CH_2)_4, (CH_2)_2,$

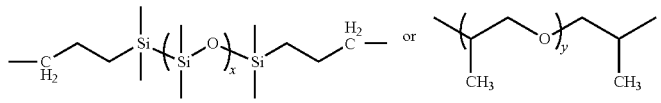

wherein n is greater than about 20 and desirably greater than about 150, wherein x can be 1 to 1000, desirably about 5 to about 25, and preferably about 8 to about 14, and wherein y can be 1 to 100, desirably about 2 to about 35, and preferably about 2 to about 8.

Example 12: poly-3,3'-yl-3,3'-methylene-((1,1'-ethane-1,2-diyl)-bis-(1-pyrrolidine-2,5-dione))

An intermediate was prepared via reaction between a monoanhydride and a diamine with molar ratio of 2:1. First, 1.1208 g of commercially available itaconic anhydride (0.01 mole), the isomer of citraconic anhydride, was dissolved in 10 g methanol in a single-neck flask along with a magnetic stirring bar. Then, 0.3006 grams of commercially available ethylene diamine (0.005 mole) was dissolved in 20 grams of methanol and then added dropwise into the solution over a one hour period. The flask was kept stirring continuously for another two hours. The reaction was noticed as exothermic. A white precipitate appeared a few minutes after ethylenediamine was added into the solution, then the solution became milky. Baeyer test result was positive, which confirmed the existence of C=C double bonds at this stage. The intermediate obtained in the first step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored rigid film. The film was sent for CHN elemental analysis to determine structure. DSC result gave a Tg of 114° C.

Example 13: poly-3,3'-yl-3,3'-methylene-((1,1'-decane-1,10-diyl)-bis-(1-pyrrolidine-2,5-dione))

An intermediate was prepared via reaction between a monoanhydride and a diamine with molar ratio of 2:1. First, 1.1208 g of commercially available itaconic anhydride (0.01 mole), the isomer of citraconic anhydride, was dissolved in 10 g methanol in a single-neck flask along with a magnetic stirring bar. Then, 0.8616 grams of commercially available 1,10-diaminodecane (0.005 mole) was dissolved in 20 grams of methanol and then added dropwise into the solution over a one hour period. The flask was kept stirring continuously for another two hours. The reaction was noticed as exothermic. A white precipitate appeared a few minutes after the diamine was added into the solution. Baeyer test result was positive, which confirmed the existence of C=C double bonds at this stage. The intermediate obtained in the first step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored flexible film. The film was sent for CHN elemental analysis to determine structure. DSC result gave a Tg of 28° C.

The glass transition temperature of examples using the Anhydride Method and the theoretical CHN contents are listed in Table 1. The theoretical CHN contents were calculated based on the structure proposed previously, which is shown below. The difference between theoretical CHN contents and the average CHN contents found from actual CHN elemental analysis is mostly less than 1 wt %, as shown in Table 1, suggesting the real structure matched the proposed structure in most of the cases. The glass transition temperature increased when a diamine of shorter chain length is used. This gives a skilled person the ability to tailor Tg by proper monomer selection.

The proposed structure for the aliphatic polyimides of this invention are:

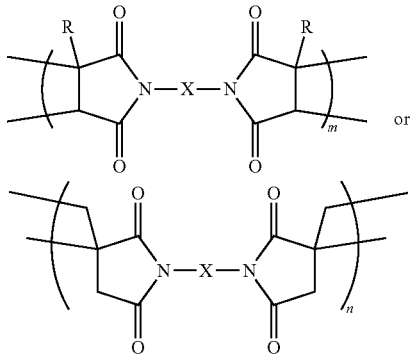

wherein m is greater than about 20, n is greater than about 20, wherein R is H for maleic anhydride or $CH_3$ for citraconic anhydride, and $X=(CH_2)_z$,

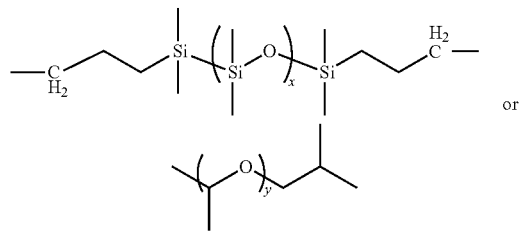

wherein x can be 1 to 1000, desirably about 5 to about 25, and preferably about 8 to about 14, and wherein y can be 1 to 100, desirably about 2 to about 35, and preferably about 2 to about 8, and wherein z is 2 to 12.

TABLE 1

Tg and CHN contents of Examples 1-13

| Example No., Composition & Solvent | Tg (° C.) | C % theory | C % Avg found | C % Δ | mole C/100 g | H % theory | H % Avg found | H % Δ | N % theory | N % Avg found | N % Δ |
|---|---|---|---|---|---|---|---|---|---|---|---|
| 1. maleic anhydride + 1,10 diaminodecane in MeOH | 89 | NA | NA | NA | NA | NA | NA | NA | NA | NA | NA |
| 2. citraconic anhydride + 1,10 diaminodecane in MeOH | 54 | 66.64 | 66.35 | 0.29 | 5.52 | 7.83 | 8.01 | 0.18 | 7.77 | 7.89 | 0.12 |
| 3. citraconic anhydride + 1,10 diaminodecane in iPA | 14 | 66.64 | 66.29 | 0.35 | 5.52 | 7.83 | 7.84 | 0.01 | 7.77 | 7.88 | 0.11 |
| 4. citraconic anhydride + 1,10 diaminodecane in THF | 44 | 66.64 | 66.56 | 0.08 | 5.54 | 7.83 | 8.10 | 0.27 | 7.77 | 7.74 | 0.03 |
| 5. citraconic anhydride + hexamethylenediamine in iPA | 30 | 63.14 | 62.96 | 0.18 | 5.24 | 6.62 | 6.48 | 0.14 | 9.20 | 9.47 | 0.27 |
| 6. citraconic anhydride + 1,4 diaminobutane in iPA | 60 | 61.31 | 60.15 | 1.16 | 5.01 | 5.14 | 6.02 | 0.88 | 10.21 | 10.42 | 0.21 |
| 7. citraconic anhydride + ethylene diamine in iPA | 170 | 58.06 | 58.83 | 0.77 | 4.90 | 4.87 | 4.54 | 0.33 | 11.28 | 11.48 | 0.20 |
| 8. citraconic anhydride + 1,9 diaminononane in MeOH | 52 | 65.48 | 64.97 | 0.51 | 5.46 | 8.10 | 7.33 | 0.77 | 8.04 | 8.22 | 0.18 |
| 9. Citraconic anhydride + aminopropyl terminated polydimethylsiloxane (MW = 850-900) in MeOH | below −30 | 41.86 | 40.19 | 1.67 | 3.35 | 8.14 | 7.71 | 0.43 | 2.57 | 2.40 | 0.17 |
| 10. Citraconic anhydride + Jeffamine (MW = 230) in MeOH | 34 | 60.13 | 59.25 | 0.88 | 4.94 | 7.63 | 7.97 | 0.34 | 6.84 | 6.87 | 0.03 |
| 11. Citraconic anhydride + 1, 12 diaminododecane in MeOH | 29 | 67.65 | 68.45 | 0.80 | 5.70 | 8.78 | 9.18 | 0.40 | 7.18 | 7.87 | 0.69 |
| 12. Itaconic anhydride + ethylene diamine in MeOH | 114 | 57.59 | 54.92 | 0.88 | 4.58 | 5.64 | 5.16 | 0.48 | 11.19 | 12.39 | 1.20 |
| 13. Itaconic anhydride + 1,10 diaminodecane in MeOH | 28 | 66.26 | 65.60 | 0.66 | 5.47 | 8.35 | 7.95 | 0.40 | 7.73 | 8.32 | 0.59 |

In Example 9, the silicon content was anayzed by elemental analysis as well. The silicon content was determined to be 27.90%, while the theoretical silicon content is in the range of 27.90-28.35%.

The glass transition temperature decreased as the length of the aliphatic diamine chain increased, due to the increased flexibility and susceptibility to oxidation of the aliphatic portion of the back bone. Therefore, when a shorter diamine chain is used, a high Tg transition is expected. The odd-even effect is observed as the glass transition of odd-numbered C atom diamine (e.g. C9 diamine based material) is lower than even-numbered C atom diamine (e.g. C10 diamine based material). The Tg ranged from −30° C. to 170° C.

Example 14, A Comparative Example

Below is the reaction scheme of this for Example 14. Here, reaction (i) is the thermal imidization by losing water molecules. Reaction (ii) is the polymerization via the reaction of C=C double bonds. Reaction (i) and (ii) both occurred during heating with no preferred sequence. The amic acid monomer (product of diacid with diamine) has to go through both these two reactions to form the final polyimide product.

Reaction Scheme for Example 14

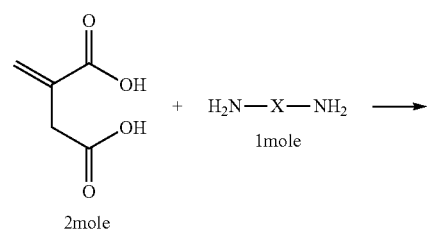

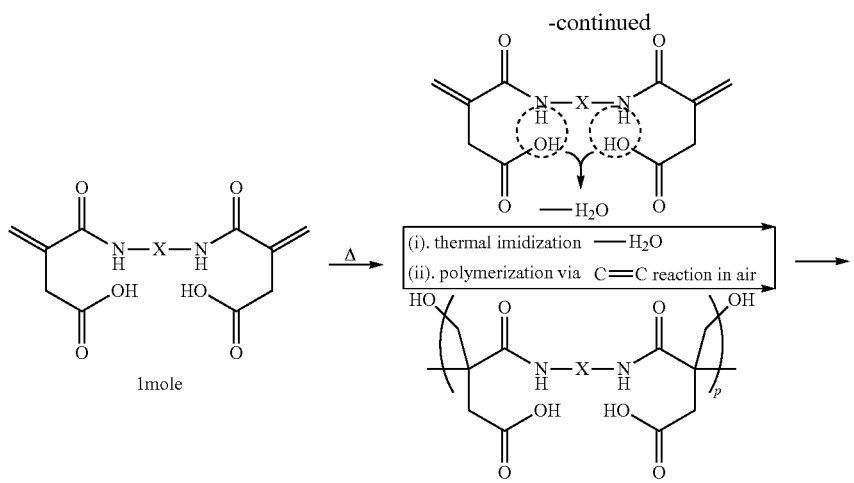
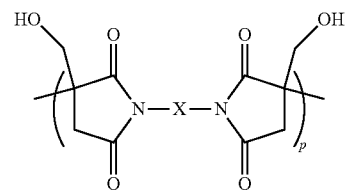

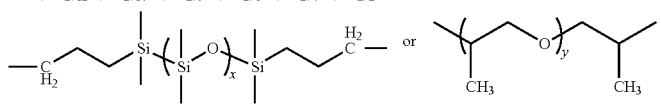

wherein p in this Example 14 is 2 to 3 which is soluble in methanol or THF; wherein x can be 1 to 1000, desirably about 5 to about 25, and preferably about 8 to about 14, and wherein y can be 1 to 100, desirably about 2 to about 35, and preferably about 2 to about 8. However, p could be possibly greater than 20 if prepared in inert conditions.

An intermediate was prepared via reaction between a di-acid and a diamine with molar ratio of 2:1. First, 1.3013 g of commercially available itaconic acid (0.01 mole) was dissolved in 10 g methanol in a single-neck flask along with a magnetic stirring bar. Then, 0.8615 grams of commercially available 1,10-diaminodecane (0.005 mole) was dissolved in 20 grams of methanol and then added dropwise into the solution over a one hour period. The flask was kept stirring continuously for another two hours. The reaction was noticed as exothermic. The solution was clear. The intermediate obtained in the first step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored viscous liquid, which could be easily dissolved in THF and methanol. The structure was confirmed to have imide functionality via FT-IR spectrum. The viscous liquid was sent to GPC analysis for molecular weight information. GPC results gave a numbered average molecular weight of 709, and the weighted average molecular weight was Mw=855. The film was sent for CHN elemental analysis to determine structure. However, the results of CHN elemental analysis did not match the predicted imide structure. The elemental results showed a higher oxygen content, suggesting isomerization during reaction.

Example 15: poly-3,3',4,4'-yl-((1,1'-decane-1,10-diyl)-bis-(3-methyl-pyrrolidine-2,5-dione))

Below is the reaction scheme of this for Example 15. Here, reaction (i) is the thermal imidization by losing water molecules. Reaction (ii) is the polymerization via the reaction of C=C double bonds. Reaction (i) and (ii) both occurred during heating with no preferred sequence. The amic acid monomer (product of diacid with diamine) has to go through both these two reactions to form the final polyimide product.

Reaction Scheme for Example 15

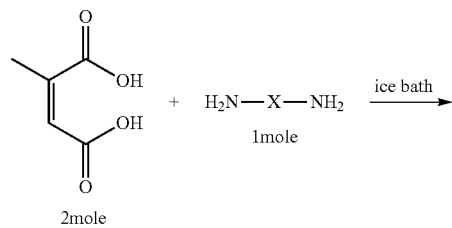

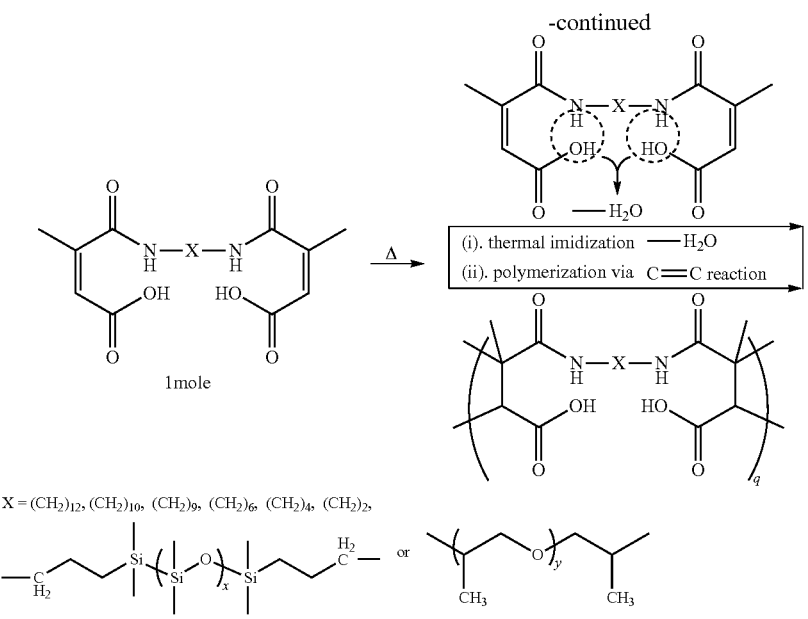

X = (CH$_2$)$_{12}$, (CH$_2$)$_{10}$, (CH$_2$)$_9$, (CH$_2$)$_6$, (CH$_2$)$_4$, (CH$_2$)$_2$, where q is greater than about 20 and desirably greater than about 150, wherein x can be 1 to 1000, desirably about 5 to about 25, and preferably about 8 to about 14, and wherein y can be 1 to 100, desirably about 2 to about 35, and preferably about 2 to about 8, and X can be (CH$_2$) where z is between 2 and 12, including the odd integers besides those shown in the Reaction Scheme above.

An intermediate was prepared via reaction between a di-acid and a diamine with molar ratio of 2:1. First, 1.3011 g of commercially available citraconic acid (0.001 mole), the isomer of itaconic acid, was dissolved in 10 g methanol in a single-neck flask along with a magnetic stirring bar. Then, 0.8615 grams of commercially available 1,10-di-aminodecane (0.005 mole) was dissolved in 20 grams of methanol and then added dropwise into the solution over a one hour period. The flask was kept stirring continuously for another two hours. The reaction was noticed as exothermic. The solution was clear. The intermediate obtained in the first step was used to prepare polyimide film via thermal imidization. First, methanol in the solution was removed by evaporation at room temperature. Then, the viscous light yellow liquid was kept at 60° C. under vacuum for 2 hours, and heated to 220° C. at a rate of 3° C./min. The final material is an amber-colored flexible film. The structure was confirmed to have mainly imide functionality (peak at 1703 cm$^{-1}$) via FT-IR spectrum along with minor amide (peak at 1536 cm-1) and aziridinium imide (peak at 1774 cm$^{-1}$) functionalities. The material was sent for CHN elemental analysis to determine structure. The results of CHN elemental analysis matched the predicated imide structure. DSC gave a Tg transition of 70° C.

These two Examples 14 and 15 are used to demonstrate that unsaturated diacid could be utilized for synthesis of polyimide. The glass transition temperature of Examples 14 and 15 and the theoretical CHN contents are listed in Table 2. The theoretical CHN contents were calculated based on the structure proposed previously, which is listed below. The actual CHN elemental contents were tested by Robertson Microlit Lab Inc. The difference between theoretical CHN contents and the average CHN contents found from actual CHN elemental analysis were mostly less than 1 wt % for Example 15, as shown in Table 2, suggesting the real structure matched the proposed structure in most of the cases. Example 15 indicated polyimide can also be derived from diacid and diamine using the stoichiometry ratio of 2/1. The CHN elemental analysis of example 14 suggested isomerization during reaction. The isomerization might result from the oxidation of C=C at high temperature when the rotation of C—C bonds is limited.

The proposed structure for these aliphatic polyimides of this invention are:

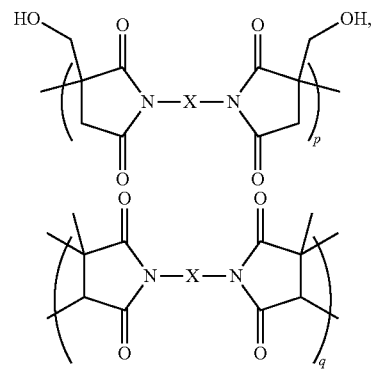

wherein p is greater than about 20, wherein q is greater than about 20, and wherein X=(CH2)z,

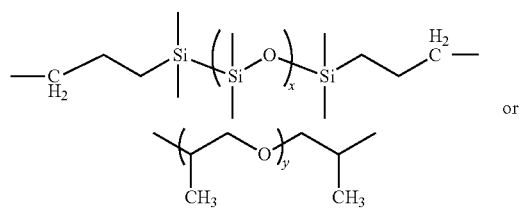

wherein x can be 1 to 1000, desirably about 5 to about 25, and preferably about 8 to about 14, and wherein y can be 1 to 100, desirably about 2 to about 35, and preferably about 2 to about 8, and wherein z is 2 to 12.

It is noted that formula AP-C is similar to formula AP-B except for the presence of hydroxyl groups. If the reaction scheme for formula AP-C were to include reaction in inert conditions, then it is possible that the resulting polyimide would be formula AP-B.

It is noted that formula AP-A and formula AP-D are the same if R=CH$_3$, even though these products are synthesized from different starting materials.

hexamethylenediamine (0.005 mole) and 0.0493 g (2 wt %) commercially available Irganox® MD 1024 (Ciba Inc.) were added into the melt at ambient conditions and stirred vigorously by a stirring rod. The reaction was exothermic. The mixture was heated on the hot plate at 220° C. for about 4 minutes. The final material was a yellow colored solid. The thermal properties were measured by DSC. The glass transition temperature was 80° C. The structure was confirmed to have mainly imide functionality (peak at 1698 cm$^{-1}$) via

TABLE 2

Tg and CHN contents of Examples 14 and 15 for diacid

| Example No., Composition & Solvent | Tg (° C.) | CHN Analysis | | | | | | | | |
|---|---|---|---|---|---|---|---|---|---|---|
| | | C % | | | | H % | | | N % | |
| | | theory | found | Δ | Mole/100 g | Theory | found | Δ | Theory | found | Δ |
| 14. Itaconic acid + 1,10 diaminodecane in MeOH | Imide, viscous liquid at RT, Mn = 709, Mw = 855 | 60.90 | 60.63 | 0.27 | 5.05 | 7.67 | 8.07 | 0.40 | 7.10 | 7.29 | 0.19 |
| 15. Citraconic acid + 1,10 diaminodecane in MeOH | 51 | 66.27 | 66.21 | 0.06 | 5.52 | 8.34 | 8.14 | 0.20 | 7.72 | 8.02 | 0.30 |

Example 14 yielded a low molecular weight, THF-soluble, and methanol-soluble polyimide.
Examples 1-13 above are not soluble in either THF or methanol.

Demonstration of Melt Reaction on Hot Plate

Example 16: poly-3,3',4,4'-yl-((1,1'-hexane-1,6-diyl)-bis-(3-methyl-pyrrolidine-2,5-dione))

The melt reaction between a di-acid and a diamine with molar ratio of 2:1 was demonstrated on a hot plate. First, 1.3014 g of commercially available citraconic acid (0.010 mole) was melted in an aluminum weighing dish on a hot plate. Then 0.5812 grams of commercially available hexamethylenediamine (0.005 mole) was added into the melt at ambient conditions and stirred vigorously by a stirring rod. The reaction was found to be exothermic. The exothermic effect was evaluated by monitoring the temperature fluctuation using an infrared thermometer. The melt of citraconic acid had a temperature of 60° C. The temperature spiked up to 110° C. in 3 seconds after hexamethylenediamine was added. The temperature fluctuated around 110° C. and then dropped to 105° C. after 30 seconds. After the temperature dropped to 90° C., the mixture was heated on the hot plate at 220° C. The melt reaction and imidization took about 4 minutes. The final material was a yellow solid under heat and it turned into a red solid during cooling. The thermal properties were measured by DSC. The glass transition temperature was 103° C.

Example 17: poly-3,3',4,4'-yl-((1,1'-hexane-1,6-diyl)-bis-(3-methyl-pyrrolidine-2,5-dione)) with stabilizer The melt reaction between a di-acid and a diamine with molar ratio of 2:1 was demonstrated on a hot plate with the presence of a stabilizer in order to get low colored materials. First, 1.3012 g of commercially available citraconic acid (0.010 mole) was melted in an aluminum weighing dish on a hot plate. Then 0.5817 grams of commercially available FT-IR spectrum along with minor amide (peak at 1538 cm-1) and aziridinium imide (peak at 1774 cm$^{-1}$) functionalities.

Example 18: poly-3,3',4,4'-yl-((1,1'-hexane-1,6-diyl)-bis-(3-methyl-pyrrolidine-2,5-dione)) with stabilizer The melt reaction between a di-acid and a diamine with molar ratio of 2:1 was demonstrated on a hot plate with the presence of a stabilizer in order to get low colored materials. First, 1.3018 g of commercially available citraconic acid (0.010 mole) was melted in an aluminum weighing dish on a hot plate. Then 0.5815 grams of commercially available hexamethylenediamine (0.010 mole) and 0.0503 g (2 wt %) commercially available Irgafos® P-EPQ (Ciba Inc.) were added into the melt at ambient conditions and stirred vigorously by a stirring rod. The reaction was exothermic. The mixture was heated on the hot plate at 220° C. for about 4 minutes. The final material was a yellow colored solid. The thermal properties were measured by DSC. The glass transition was 104° C. The structure was confirmed to have mainly imide functionality (peak at 1694 cm$^{-1}$) via FT-IR spectrum along with minor amide (peak at 1538 cm-1) and aziridinium imide (peak at 1773 cm$^{-1}$) functionalities Example 19: poly-3,3',4,4'-yl-((1,1'-hexane-1,6-diyl)-bis-(3-methyl-pyrrolidine-2,5-dione))

The melt reaction between a di-acid and a diamine with molar ratio of 2:1 was demonstrated on a hot plate. First, 1.3018 g of commercially available citraconic acid (0.010 mole) was melted in an aluminum weighing dish on a hot plate. Then 0.5810 grams of commercially available hexamethylenediamine (0.005 mole) was added into the melt at ambient conditions and stirred vigorously by a stirring rod.

The reaction was exothermic. The mixture was heated on the hot plate at 150° C. for about 3 minutes. Then the material was heated in a vacuum oven to 220° C. at a heating rate of 3° C./min. The material was cooled to room temperature under vacuum to minimize any possible oxidization during cooling. The final material was a light yellow colored solid. The glass transition temperature was 143° C. The structure was confirmed to have mainly imide functionality (peak at 1696 $cm^{-1}$) via FT-IR spectrum along with minor amide (peak at 1536 cm-1) and aziridinium imide (peak at 1774 $cm^{-1}$) functionalities.

Example 20: poly-3,3',4,4'-yl-((1,1'-hexane-1,6-diyl)-bis-(3-methyl-pyrrolidine-2,5-dione)) with stabilizer The melt reaction between a di-acid and a diamine with molar ratio of 2:1 was demonstrated on a hot plate with the presence of a stabilizer in order to get low colored materials. First, 1.3011 g of commercially available citraconic acid (0.010 mole) was melted in an aluminum weighing dish on a hot plate. Then 0.5815 grams of commercially available hexamethylenediamine (0.005 mole) and 0.0406 g (2 wt %) commercially available Irganox® MD 1010 (Ciba Inc.) were added into the melt at ambient conditions and stirred vigorously by a stirring rod. The reaction was exothermic. The mixture was heated on the hot plate at 220° C. The material turned into a yellow colored solid after about 3 minutes. The color was lighter than that of example 17. The glass transition temperature was 43° C. The structure was confirmed to have mainly imide functionality (peak at 1702 $cm^{-1}$) via FT-IR spectrum along with minor amide (peak at 1534 cm-1) and aziridinium imide (peak at 1775 $cm^{-1}$) functionalities.

Example 21: poly-3,3',4,4'-yl-((1,1'-decane-1,10-diyl)-bis-(3-methyl-pyrrolidine-2,5-dione)) with catalyst The melt reaction between an anhydride and a diamine with molar ratio of 2:1 was demonstrated on a hot plate with the presence of a catalyst in order to promote the melt reaction. First, 1.1210 g of commercially available citraconic anhydride (0.010 mole) was melted in an aluminum weighing dish on a hot plate. Then 0.8616 grams of commercially available 1,10diaminodecane (0.005 mole) and 0.0401 g sodium phenyl phosphinate were added into the melt at ambient conditions and stirred vigorously by a stirring rod. The reaction was exothermic. The mixture was heated on the hot plate at 220° C. The material turned into an amber colored solid after about 90 seconds. The glass transition temperature was 27° C. The structure was confirmed to have mainly imide functionality (peak at 1706 $cm^{-1}$) via FT-IR spectrum along with minor amide (peak at 1545 cm-1) and aziridinium imide (peak at 1772 $cm^{-1}$) functionalities.

Example 22: poly-3,3',4,4'-yl-((1,1'-hexane-1,6-diyl)-bis-(3-methyl-pyrrolidine-2,5-dione)) with catalyst The melt reaction between an anhydride and a diamine with molar ratio of 2:1 was demonstrated on a hot plate with the presence of a catalyst in order to get low colored materials. First, 1.1209 g of commercially available citraconic anhydride (0.010 mole) was melted in an aluminum weighing dish on a hot plate. Then 0.5816 grams of commercially available hexamethylenediamine (0.005 mole) and 0.0343 g sodium phenyl phosphinate were added into the melt at ambient conditions and stirred vigorously by a stirring rod. The reaction was exothermic. The mixture was heated on the hot plate at 220° C. The material turned into an amber colored solid after about 90 seconds. The glass transition temperature was 69° C. The structure was confirmed to have mainly imide functionality (peak at 1697 $cm^{-1}$) via FT-IR spectrum along with minor amide (peak at 1538 cm-1) and aziridinium imide (peak at 1772 $cm^{-1}$) functionalities.

Summary on Demonstration of Melt Reaction on Hot Plate

It has been demonstrated on hot plate that aliphatic polyimide could be made via melt reaction in a reasonable time frame. Generally, the aliphatic polyimide made from melt reaction had an amber color. However, the color could be reduced by using stabilizers or cooling the imidized films under vacuum to reduce any possible oxidization. Among three stabilizers that were used, Irgafos® P-EPQ, Irganox® MD 1024 and Irganox® MD 1010, Irganox® MD 1010 was found to be most effective in reducing colors. Irganox® MD 1024 has amide functionality itself which could lower the imide content in the final product. The method of cooling imidized films under vacuum required more time but it could lower the color with no effect on structures. It is also possible to promote the melt reaction by using selected imidization catalysts, such as sodium phenyl phosphinate. In this case, reaction times were reduced from 4 minutes at about 220° C. to about 2 minutes using about 2% loadings. This kinetics study has shown the reaction occurs in less than two minutes.

Analysis of Methods of Synthesis

Effect of monomers, solvents, process methods, stabilizers and catalysts on the thermal properties of aliphatic polyimides Number of C Atoms in Diamine The glass transition temperature (Tg) of the aliphatic polyimides fell in a range of a little above room temperature up to 170° C. when diamines with different C atoms were used. The trend found was that when a shorter diamine chain was used, there was less flexibility and therefore a higher Tg was obtained.

When a diamine with long chain length is used, e.g. Jeffamine®, or polysiloxane, Tg could be even lower than −30° C. (Examples 9 and 10).

Odd-Even Effect

The odd-even effect is observed from the Tables above, meaning that Tg of an Example using an odd-numbered diamine is usually lower than a sample using an even-numbered diamine.

Type of Anhydrides

Selection of the anhydride could affect the glass transition. Itaconic anhydride tended to give a lower Tg compared to citraconic anhydride.

Anhydride vs. Diacid

Citraconic acid and citraconic anhydride performed closely. It appeared that citraconic acid gave a slightly higher Tg than the anhydride. However, citraconic acid is a solid and citraconic anhydride is a liquid, meaning citraconic acid would be preferred due to easy handling. Itaconic acid could not form high MW polyimide. It is probably due to the oxidation of C=C bonds during reaction.

Type of Solvents

Several solvents were used to prepare aliphatic polyimides, e.g. methanol, isopropanol, and tetrahydrofuran (THF). Based on the comparative experiments, when the same monomers and conditions were used, methanol always gave a higher Tg than isopropanol or THF. Isopropanol and THF performed closely in terms of change of Tg. An interesting observation is found that THF does not show a good repeatability. In some duplicate experiments, THF could not give a high MW aliphatic polyimide probably due to the existing inhibitor during manufacturing.

Solution Process vs. Melt Process

Solution processing has two steps: formation of polyamic acid in solution and thermal imidization. Solution processing is good for better mixing and dissipation of heat for the first step. Thermal imidization happens later as a separated step. In contrast, these two types of reactions occurred successively on hot plate in several minutes. Melt processing on hot plate has mixing and dissipation of heat issues. The incomplete reaction is another issue for hot plate reaction. It is possible that these issues could be resolved if the reaction were to be done by a more complete reactive process.

Effect of Stabilizers

Stabilizers could effectively reduce the color of the aliphatic polyimides, and also lower the amide content. Three types of stabilizers were used in this invention, Irganox® MD 1024, Irgafox® P-EPQ, and Irganox® 1010. By comparison of aliphatic polyimide films prepared with and without stabilizers, use of stabilizers gave lower Tg, which possibly comes from the incomplete reaction on hot plate.

Vacuum vs. Stabilizers

Use of vacuum during cooling after imidization could effectively reduce the color of aliphatic polyimides and lower the amide content in the structure. The color of aliphatic polyimide film made by using vacuum during cooling is a very light yellow color, which probably is the intrinsic color of aliphatic polyimide itself. Any oxidation and formation of isoimide during the preparation could make the final color darker. The Tg of aliphatic polyimide film made by using vacuum during cooling is higher than those made using stabilizers for all three stabilizers used. It is possibly due to the long cooling time (about 1.5 hours) after heating.

Effect of Catalyst

It has been demonstrated that the melt reaction could be promoted by using selected imidization catalysts, such as sodium phenyl phosphinate. In Examples 21 and 22, the reaction time has been reduced from 4 minutes at 220° C. to about 2 minutes using about 2% loadings. This kinetics study has shown the reaction occurs in less than two minutes. The color goes from yellow to amber.

QUV Accelerated Weathering Test

Polyimide film was subjected a QUV accelerated weathering test. Overall, no significant changes in structure were seen via FT-IR spectra except the appearance of moisture peaks. A darker color was observed for each sample after exposure to UVA light after 250 hours and no further changes thereafter. Minor changes in flexibility of the films were noticed based on visual observation.

Glass Transition Temperatures

The glass transition temperatures of the polyimides of the invention by this method can range from about −100° C. to about 225° C. and what was observed was from less than about −30° C. (equipment limitation) to about 170° C. However a sample of another aliphatic polyimide after hydrolytic aging has shown an increase to 225° C. presumably due to further reaction; this Tg can be achievable upon initial preparation with process optimization.

Use of Aliphatic Polyimides

Compounds and Uses of Compounds

Any of the aliphatic polyimides described about can be melt-mixed with one or more conventional plastics additives in an amount that is sufficient to obtain a desired processing or performance property for the aliphatic polyimide compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers, fibers, and extenders; flame retardants; smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; catalyst deactivators, and combinations of them.

The compound can comprise, consist essentially of, or consist of any one or more of the aliphatic polyimides in combination with any one or more the functional additives. Any number between the ends of the ranges is also contemplated as an end of a range, such that all possible combinations are contemplated within the possibilities of Table 3 as candidate compounds for use in this invention.

TABLE 3

| Ingredient | Acceptable | Desirable | Preferable |
|---|---|---|---|
| Aliphatic Polyimide(s) | 30-99.999 | 70-99 | 80-95 |
| Functional Additive(s) | 0.001-70 | 1-30 | 5-20 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

Compounds of the present invention can be made into any extruded, molded, calendered, thermoformed, or 3D-printed article. Candidate end uses for such thermoplastic articles are listed in summary fashion below.

Appliances: Refrigerators, freezers, washers, dryers, toasters, blenders, vacuum cleaners, coffee makers, and mixers;

Building and Construction: Fences, decks and rails, floors, floor covering, pipes and fittings, siding, trim, windows, doors, molding, and wall coverings;

Consumer Goods: Power hand tools, rakes, shovels, lawn mowers, shoes, boots, golf clubs, fishing poles, and watercraft;

Electrical/Electronic Devices: Printers, computers, business equipment, LCD projectors, mobile phones, connectors, chip trays, circuit breakers, and plugs;

Healthcare: Wheelchairs, beds, testing equipment, analyzers, labware, ostomy, IV sets, wound care, drug delivery, inhalers, and packaging;

Industrial Products: Containers, bottles, drums, material handling, gears, bearings, gaskets and seals, valves, wind turbines, and safety equipment;

Consumer Packaging: Food and beverage, cosmetic, detergents and cleaners, personal care, pharmaceutical and wellness containers;

Transportation: Automotive aftermarket parts, bumpers, window seals, instrument panels, consoles, under hood electrical, and engine covers; and Wire and Cable: Cars and trucks, airplanes, aerospace, construction, military, telecommunication, utility power, alternative energy, and electronics.

APPENDIX

To further explain the value of the present invention, the following text helps support the identification and definition of "bio-derived monomers" for the synthesis of aliphatic polyimides, as this area of chemistry of bio-based sources or renewable resources develops monomers and other chemicals from biologically active sources.

Synthesis Methods for Starting Materials from Natural Sources

1. Citric Acid

Bio-Synthesis of Citric Acid and Purification

Citric acid is a commercially important product that has been obtained by submerged fermentation of glucose or sucrose by *Aspergillus niger*. In order for citric acid to be a useful starting material for the production of bio-derived polymers, it should be readily produced from impure starting materials such as starch hydrolyzates, invert sugars, aqueous vegetable extracts containing sugar and partially refaine sucrose sources. It has been found that traces of iron in levels as low as 0.2 ppm is sufficient to promote the generation of large amounts of non-acid-producing cells of the *Aspergillus niger*, with the result that little or no citric acid is produced. However, as referenced in U.S. Pat. No. 2,970,084 (1961) by Leonrard Schweiger discovered that low levels of ionic copper counteracts the effect of iron impurities in the starting sugar source. Following the teachings of this patent, high yields of citric acid can be obtained by the following procedure:

An aqueous medium was prepared having the following composition where in raw (not deionized) corn sugar was used as the carbohydrate source and dissolved in 4000 ml distilled water. To this was added the following nutrients:

$(NH)_2CO_3$, 0.2%; $KH_2PO_4$, 0.014%; $MgSO_4.7H_2O$, 0.100%; $ZnSO_4$, 0.001%; Corn sugar (as dextrose), 12.3%; $Cu(NO_3)_2.3H_2O$, 0.015%. The pH was adjusted to 2.55 with aqueous HCl, and the substrate sterilized in an autoclave at 125 C for 30 minutes, cooled, and transferred aspectically to about 6000 ml Pyrex® glass column fermentors, then inoculated with spores of Aspergillus niger. Fermentations were allowed to proceed at room temperature under aseptic conditions for 12 days.

The resulting broth contains about 20% citric acid and is generally purified following the teachings of Purification was done following the "lime/sulfuric acid process" as described in U.S. Pat. No. 5,426,220 (1995), A. Baniel, A. Eval. Generally the content of citric acid resulting from the above recipe is about 20% citric acid, and this mixture is filtered to remove mycellium and then treated with 680 gram of $Ca(OH)_2$ to precipitate calcium citrate. The latter is filtered, washed and reacted with 920 gram of 98% sulfuric acid to form gypsum and a solution of citric acid. The citric acid solution obtained on gypsum filtration is fed to a crystallizer or alternatively evaporated and stripped of mother liquor via vacuum filtration to yield 1050 gram of crystalline citric acid monohydrate and approximately 320 gram of 60% citric acid mother liquor which can be combined and recrystallized.

Synthesis of Citraconic Anhydride via Intermediate Itaconic

Acid (Ref.: Organic Syntheses, Coll. Vol. 2, p. 368 (1943); Vol. 11, p. 70 (1931), Note 8.

2. Itaconic Anhydride

Itaconic Anhydride from Citric Acid Monohydrate

Nine 120-g. portions of citric acid are distilled rapidly (four to six minutes), using 300-cc. Kjeldahl flasks, and all the distillates are collected in the same receiver. The distillate, which generally does not consist of two layers, is placed in an evaporating dish, 50 cc. of water is added, and the mixture is allowed to stand on a steam bath for three hours. On cooling it sets to a semi-solid mass of itaconic acid: this is filtered and washed with 150 cc. of water. The residue consists of 138 g. of perfectly white crystals melting at 165°. By concentrating the filtrate an additional 42 g. of product melting at 157-165° is obtained. The total yield is 26-27 percent of the theoretical amount, and is a convenient laboratory method since it is rapid.

3. Citraconic Anhydride

Citraconic Anhydride from Itaconic Anhydride (Ref.: *Organic Syntheses, Coll.* Vol. 2, p. 140 (1943); Vol. 11, p. 28 (1931).

Two hundred and ninety grams (equivalent to 250 grams itaconic anhydride, either can be used) is distilled rapidly at atmospheric pressure in a 500-cc. modified Claisen flask with a 15-cm. (6-in.) fractionating column; it should be noted that the success of the preparation depends upon a rapid distillation and changing the receivers without interrupting the distillation. The best yields are obtained when the heating period is of short duration. The distillate passing over below 200° consists of water and other decomposition products. The fraction which distils at 200-215° consists of citraconic anhydride and is collected separately. The yield is 170-180 g. (68-72 percent of the theoretical amount) of a product melting at 5.5-6°. On redistillation under reduced pressure there is obtained 155-165 g. (62-66 percent of the theoretical amount) of a product which boils at 105-110°/22 mm. and melts at 7-8° C.

4,1,10-Diaminodecane

Bio-Synthesis and Purification of 1,10-diamino Decane

Sebacic acid can be obtained from castor oil. Sebaconitrile can be obtained by ammonolysis of sebacic acid. Diaminodecane can be obtained by the addition of H2 to sebaconitrile with the presence of catalyst.

Step One: Castor Oil to Sebacic Acid

Sebacic acid can be obtained from castor oil by alkali fusion. The alkali fusion of castor oil at 523-548 K in the presence of excess alkali and catalyst produces sebacic acid, 2-octanol (capryl alcohol), and hydrogen. The oleochemicals (sebacic acid and 2-octanol) are precursors for industrially important plasticizers, surface coatings, and perfumery chemicals. 2-Octanol is used in plasticizers in the form of dicapryl esters of various dibasic acids.

Reaction was carried out at a temperature of 458-463 K for a long period (such as 13 h) using 1 mol of sodium or potassium hydroxide. 2-Octanone (methyl hexyl ketone) and 10-hydroxydecanoic acid were obtained as a reaction product. Using 2 mol of alkali per 1 mol of ricinoleate at 513-549 K and with a shorter reaction cycle produces 2-octanol and sebacic acid. Hydrogen was also formed with excess alkali.

The reaction flow chart is found in *Ind. Eng. Chem. Res.* 2008, 47, 1774-1778

Step Two: Sebacic Acid to Sebaconitrile

A three-necked flask, equipped with a mechanical stirrer and a thermometer which dips into the liquid, is heated in an oil bath to 160°. In the flask are placed 505 g. (2.5 moles) of commercial sebacic acid and 180 g. (3 moles) of urea, and the melt is heated with stirring for 4 hours at about 160°. The oil bath is removed, the surplus oil is wiped off, the flask is insulated, and the temperature is then raised, as rapidly as foaming permits, to 220° by means of a triple burner and wire gauze. It is important to continue the stirring for at least 5 minutes after 220° is attained; otherwise the mass will foam over during the subsequent distillation.

The stirrer is then replaced by a short still head connected to a long (90-cm.) air condenser and receiver, and the product is distilled at atmospheric pressure as long as any distillate is obtained. The temperature of the vapor rises gradually to 340°. The distillate, which consists chiefly of water, dinitrile, acid nitrile, and sebacic acid, is poured into a large separatory funnel and, after the addition of 500 ml. of ether, is extracted three times with 650-ml. portions of 5% ammonium carbonate. The crude dinitrile which remains after the removal of the ether is distilled under reduced pressure; after a small fore-run (20-25 ml.) the main product is collected at 185-188°/12 mm. The yield of sebaconitrile is 190-200 g. (46-49%).

The reaction scheme is found in *Organic Syntheses, Coll.* Vol. 3, p. 768 (1955); Vol. 25, p. 95 (1945).

Step Three: Sebaconitrile to 1,10-Decanediamine

A high-pressure bomb of about 1.1-1. capacity is charged with 82 g. (0.50 mole) of sebaconitrile and about 6 g. of Raney nickel catalyst suspended in 25 ml. of 95% ethanol, an additional 25 ml. of ethanol being used to rinse in the catalyst. The bomb is closed, and about 68 g. (4 moles) of liquid ammonia is introduced from a tared 5-1b. commercial cylinder. Hydrogen is then admitted at tank pressure (1500 lb.), and the temperature is raised to 125°. The reaction starts at about 90° and proceeds rapidly at 110-125°. When hydrogen is no longer absorbed (1-2 hours) the heater is shut off and the bomb allowed to cool. The hydrogen and ammonia are allowed to escape, and the contents of the bomb are rinsed out with two 100-ml. portions of 95% ethanol. The ethanolic solution is filtered quickly through a layer of decolorizing carbon to remove the catalyst and transferred to a 500-ml. Claisen flask having a modified side arm and connected by ground-glass joints to a receiver. The ethanol is removed by distillation at atmospheric pressure, the receiver is changed, and the decamethylene-diamine is distilled under reduced pressure. It boils at 143-146°/14 mm and solidifies, on cooling, to a white solid, freezing point 60°. The yield is 68-69 g. (79-80%).

The reaction scheme is identified in *Organic Syntheses, Coll.* Vol. 3, p. 229 (1955); Vol. 27, p. 18 (1947).

5. Tetradecylamine

Bio-Synthesis and Purification of Tetradecylamine

Myristic acid can be obtained from coconut oil via hydrolysis and fractionation. Tetradecylamine can be obtained by reaction of myristic acid with ammonia to get its nitrile, and then followed by hydration to give tetradecylamine.

Step One: Coconut Oil to Trimyristin

In the container A is placed 1500 g. of crushed nutmegs moistened with ether. A is an inverted aspirator bottle connected by a 3-mm. glass tube to the efficient condenser C, and by 3-mm. tubing, one end of which is provided with a Soxhlet thimble to the round-bottomed flask B. Flask B is connected by 3-mm. tubing of 75-cm. length to C. In B are placed 500 cc. of ether and a few chips of clay plate to prevent superheating. B is then heated on a steam cone so that the ether boils rapidly enough to reach the condenser C and to flow back through A.

The extraction with ether is continued until the ether leaving the insoluble solid is entirely colorless. This requires twenty-four to seventy-two hours, according to the state of subdivision of the nutmegs and the rate at which the ether is passed through. The ethereal solution is then freed of a small quantity of entrained insoluble matter by filtering through a folded paper. The clear solution is now entirely freed from ether by distillation on the water bath. The residue weighs 640-690 g. On cooling it sets to a mass of crystals of trimyristin which is filtered with suction and washed with 225 cc. of cold 95 percent ethyl alcohol in small portions. The product is now recrystallized from 3.5 l. of 95 percent ethyl alcohol; it is stirred mechanically during cooling since the trimyristin tends to separate as an oil at the outset. The crystallized trimyristin is then filtered off by suction and washed with 350-400 cc. of 95 percent alcohol in small portions. The crystals, which are colorless and practically odorless, melt at 54-55°. The yield is 330-364 g. Further information is found in Organic Syntheses, Coll. Vol. 1, p. 538 (1941); Vol. 6, p. 100 (1926).

Step Two: Trimyristin to Myristic Acid

In a round-bottomed flask are placed 100 g. (0.14 mole) of pure trimyristin and 200 cc. of 10 percent sodium hydroxide solution. The mixture is heated on a steam bath for two hours, with frequent shaking or stirring until the trimyristin has become emulsified. It is then diluted with 300 cc. of water and the heating is continued for another one-half hour, by which time the solution should be almost clear, indicating complete saponification. The solution is now poured with stirring into a hot solution of 650 cc. of water and 100 cc. of 20 percent hydrochloric acid. The free acid which separates is not entirely clear, owing to the presence of unchanged sodium salt. A gentle current of steam is passed into the hot mixture until the oily layer is transparent; this requires about fifteen minutes. The acid is allowed to cool and solidify; it is removed and freed of small quantities of salt and water by filtering through paper in a steamjacketed funnel. The yield is 84-90 g. (89-95 percent of the theoretical amount) of a colorless product which melts at 52-53°.

Further information is found in Organic Syntheses, Coll. Vol. 1, p. 379 (1941); Vol. 6, p. 66 (1926).

Step three: Myristic Acid to Tetradecylamine

Commercially, the synthesis of these quaternary ammonium salts involves the reaction of fatty acids with ammonia, in a combined liquid-phase-vapor-phase process, to form the corresponding fatty nitriles (I). These long-chain alkylnitriles (LANs) are converted by hydrogenation to primary or secondary amines, depending on the reaction conditions. Reductive alkylation of these amines with formaldehyde affords the trialkylamines (TAMS) (II), which are quaternized by exhaustive alkylation with methyl chloride to the final di- or trimethylalkylammonium salts (III).

Extensive purification of these products is not required to achieve the activity of the final product, so that most commercial cationic surfactants are associated with a mixture of their starting materials and reaction interme-diates. In this respect, we found in dimethylditallowammonium chloride (DMDTAC), the most common cationic surfactant used in laundry detergents, concentrations of 300-320 µg/g of $C_{14}$-$C_{18}$ LANs (I) and of 450-500 µg/g of TAMS (II).

Further information can be found in "Occurrence of Cationic Surfactants and Related Products in Urban Coastal Environments", P. Fernandez, M. Valls, J. M. Bayona, and J. Albalges *Environ. Sci. Technol.* 1991, 25, 547-550

6. Comments About Bio-Sourced Maleic Anhydride, n-butylamine

Although all monomers utilized presently cannot be determined to be all bio-derived, they indeed can be obtained from renewable sources as indicated in the Experimental section. n-butylamine is not yet commercially available from bio-derived sources, but n-butanol is and can be transformed to n-butylamine quite readily. Similarly, maleic anhydride itself is not available commercially from bio-derived sources at present but its potential precursors, namely 1,4 butanediol and succinic acid are commercially available from bio-derived sources via fermentation. Meanwhile tetradecylamine can be derived primarily from coconut oil, and is known commercially as cocoamine, or from myristicin which is isolated from nutmeg oil obtained from the nutmeg tree, genus *Myristica*. 1,10 diaminodecane is commercially available for use in making bio-nylons being obtained from castor bean oil, extracted from the castor oil plant, *Ricinus communis*.

Similarly, citraconic anhydride can be obtained from itaconic anhydride or acid which is made by heat treating citric acid. Citric acid is commercially obtained by the fermentation of sugars, e.g. fructose, beet syrup, etc. Thus the described reaction sequences above describe the novel preparation of a bio-derived aliphatic polyimide of high molecular weight from bio-derived monomers.

The invention is not limited to the above embodiments. The claims follow.

What is claimed is:

1. An aliphatic polyimide, wherein the aliphatic polyimide is poly-3,3',4,4'-yl-((1,1'-bis trimethylene-poly dimethyl siloxane-1,ω-diyl)-bis-(3-methyl-pyrrolidine-2,5-dione)).

2. The aliphatic polyimide of claim 1, wherein the polyimide is formed by the reaction of a monoanhydride to a diamine at a 2:1 molar ratio, giving a ring-opened amic acid, followed by self-polymerization at a temperature of about 220° C. to form the aliphatic polyimide, wherein the monohydride is citraconic anhydride.

3. An aliphatic polyimide which is a reaction product of a 2:1 molar ratio of an unsaturated monoanhydride with a diamine, wherein the diamine is aminopropyl terminated polydimethyl siloxane and wherein the unsaturated monoanhydride is citraconic anhydride.

4. A compound comprising the aliphatic polyimide of claim 1 and one or more functional additives.

5. The compound of claim 4, wherein the functional additive is selected from the group consisting of adhesion promoters; biocides; anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; catalyst deactivators, and combinations of them.

* * * * *